US009588795B2

(12) United States Patent
McWilliams et al.

(10) Patent No.: US 9,588,795 B2
(45) Date of Patent: Mar. 7, 2017

(54) MONITORING AND REPORTING RESOURCE ALLOCATION AND USAGE IN A VIRTUALIZED ENVIRONMENT

(71) Applicant: Aspen Timber LLC, Reston, VA (US)

(72) Inventors: Kenneth L. McWilliams, Waterford, VA (US); Prasad Siddabathuni, Fairfax, VA (US)

(73) Assignee: Aspen Timber LLC, Reston, VA (US)

( * ) Notice: Subject to any disclaimer, the term of this patent is extended or adjusted under 35 U.S.C. 154(b) by 9 days.

(21) Appl. No.: 14/551,617

(22) Filed: Nov. 24, 2014

(65) Prior Publication Data

US 2016/0147550 A1    May 26, 2016

(51) Int. Cl.
*G06F 9/455* (2006.01)
*G06F 9/50* (2006.01)
(Continued)

(52) U.S. Cl.
CPC ........ *G06F 9/45558* (2013.01); *G06F 9/5027* (2013.01); *G06F 11/30* (2013.01); *G06F 21/00* (2013.01); *G06F 21/121* (2013.01); *G06F 21/552* (2013.01); *G06F 2009/45591* (2013.01); *G06F 2009/45595* (2013.01)

(58) Field of Classification Search
CPC .... G06F 9/45558; G06F 9/5027; G06F 11/30; G06F 21/00; G06F 21/121; G06F 21/552; G06F 2009/45591; G06F 2009/45595
See application file for complete search history.

(56) References Cited

U.S. PATENT DOCUMENTS 7,096,469 B1    8/2006   Kubala et al.
7,620,953 B1 *  11/2009  Tene ..................... G06F 9/5077
                                                  709/203
(Continued)

OTHER PUBLICATIONS

Wolf, Chris, "Virtualization Licensing and Support Lethargy: Curing the Disease That Stalls Virtualization," Burton Group, Data Center Strategies: In-Depth Research Report, Jan. 22, 2008, accessed from Google Scholar: <upgrade.vmware.com/files/pdf/analysts/Burton-Virtualization-Licensing-Support.pdf>, 51 pages.

*Primary Examiner* — Benjamin Wu
*Assistant Examiner* — James J Lee
(74) *Attorney, Agent, or Firm* — Banner & Witcoff, Ltd.

(57) ABSTRACT

Various aspects of the disclosure relate to monitoring of resource usage in a virtualized environment, including usage of a physical processor that executes a virtual machine or an application of the virtualized environment. By monitoring physical computing resources (e.g., by number and type) that are used to execute a virtual machine or an application of the virtualized environment, a user may, for example, be informed as to when physical computing resources are used in excess or less than the limits set by the license. In some embodiments, additional actions may be taken to update the license to better satisfy the user's resource requirements or reduce the amount paid annually for ongoing technical services. To inform a user, or form the basis for the additional actions, a report may be generated that includes data describing how a virtual machine or application executed on the physical computing resources.

18 Claims, 10 Drawing Sheets

(51) Int. Cl.
*G06F 11/30* (2006.01)
*G06F 21/00* (2013.01)
*G06F 21/12* (2013.01)
*G06F 21/55* (2013.01)

(56) References Cited

U.S. PATENT DOCUMENTS

| | | | |
|---|---|---|---|
| 8,612,480 B2* | 12/2013 | Wooldridge | G06F 21/10 707/737 |
| 9,286,448 B2* | 3/2016 | Cushion | G06F 21/105 |
| 2005/0144025 A1* | 6/2005 | Katz | G06Q 30/0283 705/400 |
| 2007/0124730 A1* | 5/2007 | Pytel | G06F 11/3423 718/100 |
| 2008/0028409 A1* | 1/2008 | Cherkasova | G06F 9/5061 718/104 |
| 2009/0055835 A1* | 2/2009 | Zhu | H04L 41/0896 718/105 |
| 2010/0138828 A1* | 6/2010 | Hanquez | G06F 9/45533 718/1 |
| 2011/0061050 A1* | 3/2011 | Sahita | G06F 9/45533 718/1 |
| 2011/0072431 A1* | 3/2011 | Cable | G06F 9/5077 718/1 |
| 2011/0078510 A1* | 3/2011 | Beveridge | G06F 11/2247 714/38.1 |
| 2011/0093861 A1* | 4/2011 | Flemming | G06F 9/45516 718/104 |
| 2011/0119191 A1* | 5/2011 | Stern | G06F 9/45533 705/59 |
| 2011/0239215 A1* | 9/2011 | Sugai | G06F 9/45558 718/1 |
| 2011/0296429 A1 | 12/2011 | Segmuller et al. | |
| 2012/0159367 A1* | 6/2012 | Calcaterra | G06F 9/5011 715/771 |
| 2012/0198447 A1* | 8/2012 | Osogami | G06F 9/5066 718/1 |
| 2012/0204186 A1 | 8/2012 | Davidson, II et al. | |
| 2012/0260248 A1* | 10/2012 | Katiyar | G06F 9/45533 718/1 |
| 2013/0103835 A1* | 4/2013 | Yotsutani | G06F 9/4887 709/225 |
| 2013/0159910 A1* | 6/2013 | Bostic | G06F 11/3048 715/772 |
| 2013/0247044 A1* | 9/2013 | Bingham | G06F 9/45533 718/1 |
| 2013/0283263 A1 | 10/2013 | Elemary | |
| 2014/0316953 A1* | 10/2014 | Pangarkar | G06Q 30/0283 705/30 |
| 2015/0381442 A1* | 12/2015 | Delgado | H04L 43/065 713/168 |

* cited by examiner

FIG. 9

MONITORING AND REPORTING RESOURCE ALLOCATION AND USAGE IN A VIRTUALIZED ENVIRONMENT

COPYRIGHT NOTICE

A portion of the disclosure of this patent document contains material which is subject to copyright protection. The copyright owner has no objection to the facsimile reproduction of the patent document or the patent disclosure as it appears in the Patent and Trademark Office patent file or records, but otherwise reserves all copyright rights whatsoever.

FIELD

Aspects of the disclosure relate to computer hardware and software. In particular, one or more aspects of the disclosure relate to the monitoring and reporting of physical computing resources allocated to and used by virtual computing resources in a virtualized environment.

BACKGROUND

Computing device virtualization allows for the dynamic utilization of physical computing resources. A collection of computing devices or servers forming a pool of computing hardware resources are often operated in a virtualized environment where physical hardware computing resources are optimized when the virtualization software assigns physical hardware computing resources to virtual computing machines for use in executing software program applications. Two common applications for a virtualized environment include a cloud computing system that, for example, remotely hosts an application for other computing devices in communication with the cloud computing system via a network, or a dedicated onsite data center where varied physical computing hardware resources are connected via a network for purposes of efficiently executing software applications. Specific software applications, however, are often tied to a software license, such as an end-user license agreement (EULA). The license granted to the user often restricts the user to execute software applications based upon the allocation and usage of the physical computing resources that are made available to the licensed software application. Further, many licenses require that particular physical hardware metrics, e.g. processor core number and type, be used to execute the software application. For example, a software vendor may establish a license with a limit on the computing processing capacity that is made available to an application or a virtual machine in the virtualized environment.

License management and compliance become problematic for virtualized environments in part because of the dynamic nature of the physical computing resource allocation. A common solution to lessen the risk of a software license overage grant is for a software vendor to perform a full audit of a customer's system. However, such audit snapshots cannot ascertain past or present allocation metrics in a dynamic virtualized environment; nothing prevents a customer from changing system settings before the audit to appear in compliance, or after the audit, to change actual usage to create a license overage. Additionally, the relationship between a vendor and a customer can be strained when faced with such audits which consume valuable resources on both sides, in addition to increased risk that disruption to the customer's computing environments may occur.

Virtualized environments also increase the risk that a software license overage occurs unintentionally. For example, the physical resources assigned to execute an application can be different than those intended/licensed. In some instances, a hypervisor, which provides an abstraction layer between the physical hardware and the virtual machines of a virtualized environment, may present provisioning options to a virtual machine that do not match those processing metrics granted by the software license. Further, in the dynamic virtualized environment where the hypervisor may be set to optimize software application performance based upon an over-arching optimization policy, the hypervisor may assign a processor capable of executing the virtual machine that may be in excess of the capacity requested by the virtual machine and the hypervisor may not inform the virtual machine that it is being assigned to a physical processor with excess capacity. Such assignments by a hypervisor may unintentionally result in an overage of a software application license. Additionally, even if the number of physical processor cores allocated to a virtual machine is within license limits, the underlying processing speeds of the physical processing resources assigned to the virtual machine may be comprised of different classes, and as such, a software application could be assigned to a processor class for which it is not licensed. Such a scenario increases the difficulty in ensuring that the number and types of physical computing hardware resources assigned to a virtual machine are within license limits. Moreover, multiple instances of an application or additional virtual machines may be managed by multiple hypervisors as part of a computing network (e.g., one hypervisor for a public cloud computing system and a second hypervisor for a private cloud computing system). Each individual virtual machine or application instance may be executing in compliance with the license, but in the aggregate, the usage by the applications and/or virtual machines may result in an overage of the license.

SUMMARY

Aspects of the disclosure provide more efficient, effective, functional, and convenient ways of monitoring and reporting resource usage in a virtualized environment. For example, in one or more embodiments discussed in greater detail below, aspects of the disclosure relate to the monitoring and reporting of the physical computing resources used in a virtualized environment. The monitoring and/or reporting of the physical computing resources may, for example, improve the physical computing resource usage of the virtualized environment or cause the virtualized environment to use the physical computing resources more efficiently.

Various aspects of the disclosure relate to the monitoring and reporting of the physical computing resources that were used to execute a virtual machine or an application in a virtualized environment. For example, one or more embodiments may include identifying a virtual machine established in a virtualized environment, which controls execution of the virtual machine on one or more physical computing resources by at least allocating, via a hypervisor, one or more physical processors from a physical processor pool to execute the virtual machine. Various embodiments may include monitoring the virtualized environment in order to determine a first type of physical processor that the virtual machine was informed by the hypervisor to be allocated from the physical processor pool for executing the virtual machine and to determine a second type of physical processor that was used from the physical processor pool to execute the virtual machine. In some instances, the second type of physical processor may be different from the first type of physical processor. Various embodiments may further include storing an indication of the first type of physical processor and an indication of the second type of physical processor, or compiling stored indications to produce a detailed and secure report for purposes of, for example, license compliance and network resource allocation.

Additional aspects relate to the reporting of data describing how the virtual machine or application executed on the physical resources. For example, some embodiments may include, after storing the indication of the first type of physical processor and the indication of the second type of physical processor, generating data describing how the virtual machine executed on the second type of physical processor. Various embodiments may include reporting the data such as by storing the data describing how the virtual machine executed on the second type of physical processor or transmitting, via a network, the data describing how the virtual machine executed on the second type of physical processor.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 8-10 provide example user interfaces that illustrate various aspects of monitoring and reporting resource usage described herein.

DETAILED DESCRIPTION

Figure 1:
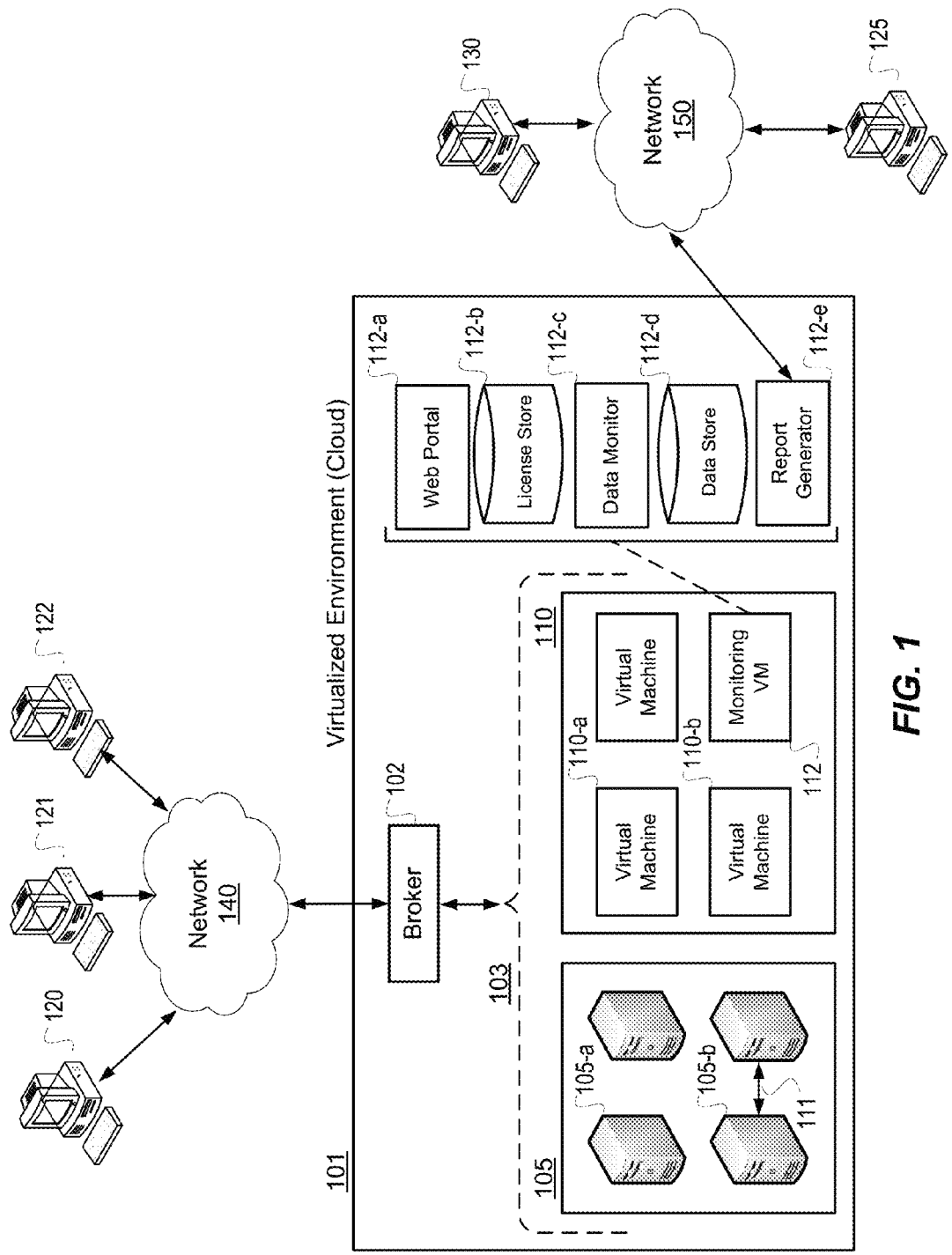
FIG. 1 depicts an illustrative system architecture that includes a virtualized environment that may be used in accordance various aspects of the disclosure.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Various aspects of this disclosure relate to the monitoring (or tracking) and reporting of resource allocation and usage in a virtualized environment. Throughout this disclosure, the examples will be described in terms of resource usage. Resource usage can be considered as including resource allocation. Many examples described in detail throughout this disclosure will monitor the usage of the physical resources in a virtualized environment, including the type and speed of the physical processor used to execute a virtual machine or an application executing in the virtualized environment. As will be discussed in more detail below, when monitoring the usage of the physical resources, various types of metrics may be determined including, among others, indications of physical processor usage, physical processor class, physical processor type, input/output (I/O) usage, and physical memory usage. By monitoring the physical resources that are actually used to execute a virtual machine or an application executing in the virtualized environment, a customer, vendor or other user (each may interchangeably referred to as a user) may, for example, be informed as to when a license overage results from excess usage of the resources or when usage of the resources is less than the limits set by the license. In some embodiments, additional actions may be taken to update the license to better satisfy the customer's requirements, which may, for example, result in the customer paying less or more license fees and less or more ongoing technical services fees depending upon the most recent metrics that describe the customer's actual usage of the physical resources. To inform a customer, vendor or other user, or form the basis for the additional actions, a secure report may be generated that includes data describing how a virtual machine or application was sourced to the physical resources. In addition to periodic reports, some embodiments may contain a real-time alert mechanism that displays one or more metrics of interest to a user.

As will become apparent throughout the examples described throughout this disclosure, various embodiments may be compatible with off-the-shelf hypervisors and virtual machines. Various embodiments may not require any customization or modification of a hypervisor or virtual machine. Indeed, the various features described throughout this application may be embodied in software that can be included in an off-the-shelf virtual machine configured to communicate with one or more off-the-shelf hypervisors. Further, the manner in which the various embodiments perform the monitoring and/or reporting of the resource usage may be non-intrusive, secure, and may provide the ability to aggregate physical processor type and capacity allocations across disparate cloud computing system providers and virtualized environments. Further, in some embodiments, the reporting of the resource usage may not affect the functionality of a remotely-hosted application (interchangeably referred herein as an application) or its operating environment. Additionally, it is noted that many of the examples described throughout this disclosure will be described in terms of a virtualized environment. The embodiments herein may also be used in sub-capacity environment (a type of virtualized environment) where an application may be licensed for less than the full capacity of one or more physical computing devices or servers.

FIG. 1 depicts an illustrative system architecture that includes a virtualized environment. As seen in FIG. 1, virtualized environment 101 may be a part of a cloud computing system that provides various computing services (e.g., remote hosting of an application) to client computing devices 120-122, which communicate with the virtualized environment via network 140. In some embodiments, each of the client computing devices 120-122 may be a laptop computing device, desktop computing device, tablet computing device, mobile computing device, wired and/or wireless communication terminal, a gateway device, set-top box, or internet-enabled television. Additionally, the client computing devices 120-122 may be associated with customers (also interchangeably referred to as end-users) of the virtualized environment 101. Depending on implementation, the virtualized environment 101 may be public, private, hybrid or cloud-brokered. Additionally, the virtualized environment 101 may be one of several virtualized environments used by an enterprise in providing the computing services to the client computing devices 120-122. Customers or end users of the virtual environment 101 might or might not be aware of the distinctions between the several virtualized environments.

The virtualized environment 101 may include various computing resources such as a computing resource allocation layer 102 and a resource pool 103 that is managed by the broker 102. The resource pool 103 may include both physical computing resources 105 and virtual computing resources 110, where the virtual computing resources 110 are an abstraction of the physical computing resources 105 and managed by one or more hardware abstraction layers (HALs).

The physical computing resources 105 may be a collection of physical computing devices or physical servers. When deployed as part of a virtualized environment, a physical computing device or server may be referred to as a virtualization server (e.g., virtualization server 105-*a* and 105-*b*). Each virtualized environment may include interconnections between the physical computing resources 105 (e.g., interconnection 111) that allow each physical computing resource 105 to communicate with each other. In some arrangements, the physical computing resources 105 may be organized into a local area network or a computer cluster. The physical computing resources 105 may be virtually consolidated or abstracted by virtualization software that includes a hardware abstraction layer (HAL). The HAL may abstract the physical computing resources 105 into a number of virtual computing resources 110, such as virtual machines. The virtualization software may be configured to aggregate the physical computing resources 105 together into a physical resource pool and make the pool available to execute the virtual machines. For example, the HAL may present options from the physical computing resources 105 to an instance of a virtual machine (e.g., virtual machine 110-*a* or 110-*b*) and may allocate, based on the requirements of the virtual machine, a particular physical resource (e.g., a particular processor, a particular number of processor cores, or a particular processing capacity) from those available for executing the instance of the virtual machine. One example of a HAL is a hypervisor. Additional details related to how a hypervisor pools the physical computing resources 105 and makes the physical resource pool available for executing one or more virtual machines are described in connection with FIG. 2.

The virtual computing resources 110 may include virtual machines that are executed in order to provide a user with the computing services of the virtualized environment 101. For example, virtual machine 110-*a* may be executed to remotely host an application for client computing device 120, while virtual machine 110-*b* may be executed to remotely host another instance of the application for client computing device 121. Different applications could be hosted for each client computing device 120-122. The virtual computing resources 110 may also include a monitoring virtual machine 112 that provides the monitoring and reporting functionality described throughout this disclosure.

Monitoring virtual machine 112 or monitoring VM 112 may be configured to include the resources and/or software necessary to monitor and report the resource usage of virtualized environment 101 (or, in addition, any other virtualized environment in communication with broker 102). As depicted in FIG. 1, monitoring virtual machine 112 may be configured with a web portal 112-*a* that provides user interfaces for interacting with a user; a license store 112-*b* that stores license information; a data monitor 112-*c* that, when the monitoring virtual machine 112 is executed, provides for the monitoring of the resource usage; a data store 112-*d* that stores one or more metrics that describe the resource usage and were determined as a result of the monitoring; and report generator 112-*e* that, when the monitoring virtual machine is executed, provides for the reporting of data describing how one or more virtual machines and/or applications used physical computing resources. In some embodiments, report generator 112-*e* may organize the data into a report; may store the report for later use (e.g. for viewing by a user, or for taking additional actions based on the data of the report); and/or may transmit the report to one or more other computing devices (e.g., transmit an e-mail to a user associated with computing device 130 via network 150). Additional details as to how monitoring virtual machine 112 performs the monitoring and reporting of the resource usage will be discussed in connection with FIGS. 3-6.

While the examples throughout this disclosure will describe the monitoring and reporting as being performed by monitoring virtual machine 112, other embodiments may bundle the monitoring and reporting functionality with other types of vendor-provided software solutions or as software as a service (SaaS) solution provided by third-party infrastructure or cloud provider. Additionally or alternatively, the monitoring and reporting may be performed by monitoring computing device 125 via software executing on the monitoring computing device 125.

In some embodiments, the monitoring virtual machine 112 may not provide a customer of the virtualized environment or a vendor of the virtualized environment with full data permissions. Instead, administrative access may be reserved for a third-party vendor of the monitoring virtual machine 112. In some instances, the third-party vendor may be the user associated with computing device 130.

The broker 102 (also sometimes referred to as an agent, cloud broker, or cloud agent) may provide a single interface for client computing devices 120-122 to communicate with the virtualized environment 101 via network 140 (e.g., the Internet or other communication network) to, among other things, request access to one or more of the computing resources provided by the virtualized environment 101. The broker 102 may be configured to enable communication from the virtualized environment 101 to the client computing devices 120-122 and enable communication from the client computing devices 120-122 to the virtualized environment 101. In some embodiments, broker 102 may be implemented via software and configured to create and maintain relationships with multiple cloud computing systems, cloud providers, or virtualized environments. Broker 102 may act as an interface between the customers of the computing services provided by the virtualized environments (e.g., virtualized environment 101 and any other environment in communication with broker 102, such as another data center at a different geographic location) and the virtualized environments themselves. For example, broker 102 may manage the selection, provisioning, and scaling of the virtualized environments. The broker 102 may provide a set of application programming interfaces (APIs) and/or one or more user interfaces (e.g., web-based user interfaces or user interface provided via a standalone software) to allow cloud operators to manage resources of the virtualized environment, configure the virtualized environment, manage customer accounts, and perform other administration tasks. The broker 102 also may include a set of APIs and/or one or more user interfaces configured to receive requests from customers or end users via client computing devices 120-122.

Figure 2:
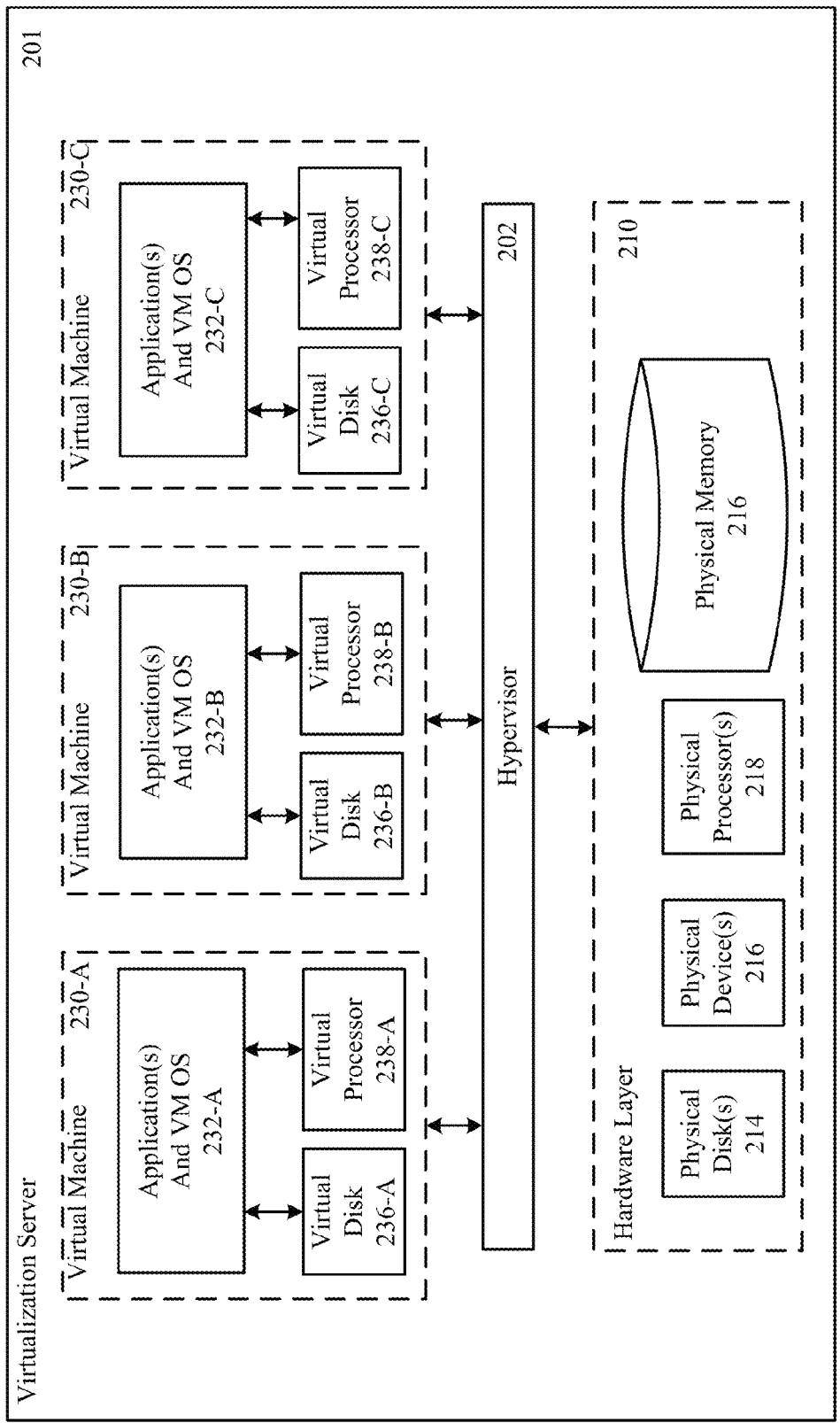
FIG. 2 depicts an illustrative virtualization computing device or virtualization server that may be used in accordance one or more aspects of the disclosure.

FIG. 2 depicts an illustrative virtualization computing device or virtualization server. Each of the physical computing resources 105 of FIG. 1 (e.g., virtualization server 105-a or 105-b, etc.) may be deployed similar to the virtualization server 201 depicted in FIG. 2. Included in virtualization server 201 is a hardware layer 210 that may include one or more physical disks 214, one or more physical devices 216, one or more physical processors 218 (e.g., one or more central processing units have one or more physical processing cores), and one or more physical memories 216. The one or more physical devices 216 may include I/O devices, network interface devices, or other types of physical computing components including those discussed below in connection with FIG. 7. For example, the one or more physical devices 216 may include, for example, a network interface card, a video card, a keyboard, a mouse, an input device, a monitor, a display device, speakers, an optical drive, a storage device, a universal serial bus interface, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 201.

In some embodiments, one or more hypervisors, such as hypervisor 202, or other type of HAL, may be embodied in software and stored in a memory element of the physical memory 216 and can be executed by one or more of the physical processors 218. In other embodiments, a hypervisor may be embodied in hardware. Additionally, there are various types of hypervisors that may be implemented in a virtualization server. For example, a Type 2 hypervisor executes within an operating system of the virtualization server 201. A Type 1 hypervisor may execute on the virtualization server 201 by directly accessing the hardware and resources within the hardware layer 210. That is, while a Type 2 hypervisor accesses system resources through a host operating system, a Type 1 hypervisor may directly access all system resources without a host operating system 314.

Hypervisor 202 may be configured to create and manage any number of virtual machines. Generally, a virtualized environment (e.g., the virtualized environment 101 of FIG. 1) may control execution of a virtual machine on one or more physical computing resources by at least allocating, via the hypervisor, one or more physical processors from a physical processor pool to execute the virtual machine. The hypervisor 202 may be configured to facilitate a virtual machine's access to the physical computing resources of the hardware layer 210 and maintain isolation between the various virtual machines established in the virtualized environment or virtualization server (e.g., virtual machines 230-A, 230-B and 230-C). In some embodiments, the hypervisor 202 may appear to the virtual machines as physical hardware and may process the interactions between the virtual machines and the actual physical computing resources of the hardware layer 202 used to execute the processes of the virtual machine (e.g., application and VM operating system 232-A, 232-B and 232-C). The hypervisor may assign or allocate physical computing resources, such as the physical processors 218, to each of the virtual machines that it manages based on parameters specific to each virtual machine (e.g., virtual machine permissions) that place a limit on, for example, the physical processor capacity and the processor core type that may be allocated to a virtual machine.

The hypervisor 202 may be configured to allocate the physical computing resources of the hardware layer 210 either at creation or provisioning time of a virtual machine. Additionally, the hypervisor 202 may be configured to dynamically change or scale the allocation (e.g., via a scale up or scale down operation) as loads and internal policies dictate. Scaling up operations may be performed on a single virtual machine level and/or by provisioning a new virtual machine to share in the workload as the hypervisor 202 determines to be necessary. Scaling down operations may be performed by reducing the physical computing resources allocated to a specific virtual machine and/or one or more virtual machines may be removed from operation, which may free physical computing resources previously allocated to the removed virtual machine.

Based on allocations controlled via the hypervisor 202, one or more virtual machines (e.g., virtual machine 230-A, 230-B and 230-C) may be executing on one or more of the physical processors 218. A virtual machine may be embodied as a set of executable instructions that, when executed by a processor 218, imitate the operation of a physical computer such that the virtual machine can execute programs and processes much like a physical computing device. Accordingly, each virtual machine 230 may include a virtual disk (e.g., virtual disk 236-A, 236-B, and 236-C) and a virtual processor (e.g., virtual processor 238-A, 238-B and 238-C). A virtual disk, in some embodiments, may be a virtualized view of one or more physical disks 214 of the virtualization server 201. A virtual processor, in some embodiments, may be a virtualized view of the one or more physical processors 218 of the virtualization server 201. In some embodiments, a first virtual machine 230-A may operate by "executing" an application and/or a virtual machine operating system within the virtual machine, which, in turn, causes the application and/or virtual machine operating system to be executed by the physical computing resources of the hardware layer 210.

Additionally, the hypervisor 202 may provide a set of APIs or other mechanisms that allow for the extraction of various pieces of information related to the virtual machines and the hardware layer. Various calls may be made using this set of APIs when monitoring the resource usage in the virtualized environment. As noted above, certain embodiments may contain multiple hypervisors which can be monitored across an integrated network system with the results being aggregated and reported in a consolidated manner for the network system as a whole.

As discussed above, the resources and/or software necessary for performing the monitoring and reporting of the resource usage may be provisioned within the environment being monitored (e.g., within virtualized environment 101, such as by monitoring virtual machine 112) or outside the environment being monitored (e.g., monitoring computing device 125). FIGS. 3-6 provide example methods for performing aspects of monitoring and reporting resource usage in a virtualized environment. FIGS. 3-6 will be described in connection with FIGS. 8-10, which provide example user interfaces that illustrate various aspects of the monitoring and reporting described herein. For simplicity, the examples of FIGS. 3-6 will be discussed in terms of monitoring virtual machine 112. As the monitoring virtual machine 112 executes on one or more physical computing resources (e.g., virtualization server 105-a may execute monitoring virtual machine 112), one or more computing devices that include the one or more physical computing resources may be caused to perform the various steps of FIGS. 3-6.

Figure 3:
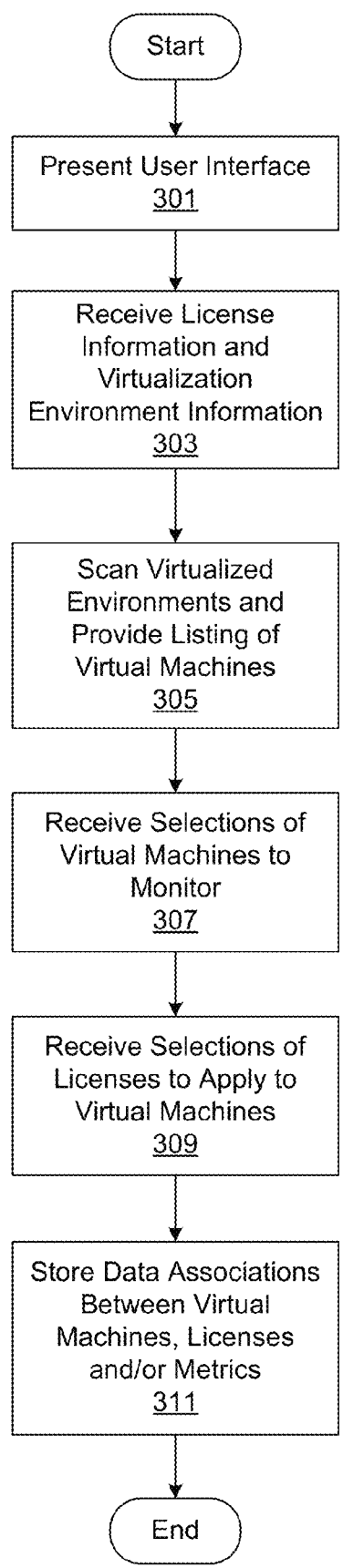
FIGS. 3-6 provide example methods for performing aspects of monitoring and reporting resource usage in a virtualized environment.

FIG. 3 illustrates an example method for establishing one or more metrics that will be monitored as one or more virtual machines execute in a virtualized environment. In some embodiments, the method of FIG. 3 may be performed by the web portal 112-a of the monitoring virtual machine 112.

At step 301, a user interface may be presented. In some arrangements, the user interface may be automatically presented upon boot-up of the monitoring virtual machine 112 or the web portal 112-a. The user interface generated at step 301 allows for a user (e.g., an operator of the vendor of the virtualized environment) to input the information necessary to initialize the monitoring virtual machine 112 for monitoring and reporting.

In some embodiments, upon presentation of the user interface, the user may be required to authenticate before proceeding with the remaining steps of FIG. 3. For example, a user may need to log into the monitoring virtual machine 112 using a user ID and/or password that may have been previously established with the third-party vendor of the monitoring virtual machine 112. In some instances, logging into the monitoring virtual machine 112 may include launching a browser and loading a pre-determined URL (e.g., localhost:8080) to complete the log in process. If a profile is not complete, the user may be required to enter in preliminary information about the vendor of the virtualized environment, such as a company name, e-mail address, and other company information. The user may be required to input a license key for the monitoring virtual machine 112 that was provided by the third-party vendor of the monitoring virtual machine 112. The license key may provide a limit on the number of applications and/or virtual machines that may be monitored by the monitoring virtual machine 112.

Figure 8:
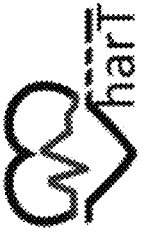

If authentication is complete and/or was not required, the user interface may present a navigation screen that allows a user to select various options for configuring the virtual machine 112 (e.g., one or more options for configuring a license store, one or more options for configuring which virtualized environments and/or virtual machines to monitor, one or more options for configuring how to perform the reporting of the resource usage). The user may select various options presented in the navigation screen to cause the method to proceed to various ones of the remaining steps of FIG. 3. FIG. 8 depicts an example navigation screen. In particular, FIG. 8 provides an example user interface 800 that presents a navigation screen with selectable options (801-a to 801-f).

At step 303 of FIG. 3, license information and virtualized environment information may be received via the user interface. In some embodiments, the user may be required to enter data via the user interface to create a database record for each application or virtual machine that the user wishes to monitor (e.g., database records for license information). Various fields of a database record may be manually entered by a user. In some embodiments, one or more remaining fields of a database record may be automatically generated by the monitoring virtual machine 112. Each database record of the license information may include fields such as the following data fields.

i. An application name or a virtual machine name that is to be monitored by the monitoring virtual machine 112.

ii. A vendor name that identifies the vendor of the application or virtual machine.

iii. A license identifier (e.g. a number) that identifies the license that the application or virtual machine is subject to.

iv. A begin date that provides the beginning date for the license.

v. An end date that provides the end date for the license (unless the license is perpetual).

vi. A licensed core identifier that identifies the type of physical processor or number of physical processing cores that the application or virtual machine is licensed to use.

vii. A token that may be auto-generated by the monitoring virtual machine 112 to provide a unique identifier for the database record.

viii. An active flag that indicates the application or virtual machine is to be monitored as it executes in one or more virtualized environments, which allows for the monitoring of an application or virtual machine to be turned on or off across one or more virtualized environments.

In some embodiments, the user may be required to enter data via the user interface to create a database record for each virtualized environment that includes an identification of the one or more applications and/or virtual machines that are to be monitored (e.g., data records for virtualized environment information). The database records for the virtualized environment information may be stored in the license store 112-b and, in some embodiments, may be stored in a partition separate from the database records for the license information. Each database record of the virtualized environment information may include fields such as the following data fields.

i. A provider type that identifies the provider and allows the monitoring virtual machine 112 to identify the corresponding API that may be used when scanning the virtualized environment and to identify the remaining data fields that should be used for the database record. Examples of a provider type include, among others, VMWare vCenter and Amazon EC2.

ii. One or more data fields selected based on the provider type. A portion of these data fields may define properties required for communicating with the virtualized environment. For example, for a VMWare vCenter provider type, the database record may include 1. a vCenter uniform resource locator (URL);

2. a vCenter user ID;

3. a vCenter password;

4. vCenter notes/tags; and 5. vCenter comments.

After entering in the data for a database record of the virtualized environment information, the user may be able to validate the connection to the virtualized environment prior to committing the database record to the license store. If the connection is successful, the user may be prompted to store the database record of the virtualized environment information to the license store 112-b. If the connection is not successful, an error message may be presented to assist the user in troubleshooting.

The user may be able to view the data stored in the license store 112-b. However, in some embodiments, the user may have limited permissions to change the data stored in the license store 112-b. For example, once a database record is created and stored in the license store 112-b, the user may only be able to modify particular fields (e.g., modify begin date or end date fields, or modify an active flag field), but may not be able to delete an entire database record.

After the license information and the virtualized environment information are stored, the user may navigate the user interface to cause the method to proceed to step 305.

At step 305, one or more virtualized environments may be scanned and a listing of virtual machines executing on each of the one or more virtualized environments may be presented in the user interface. Based on the database records of the virtualized environment information, one or more virtualized environments may be identified. To perform the scan, connections to each of the one or more virtualized environments may be established based on the corresponding database record of the virtualized environment information and one or more queries may be performed using the API of the appropriate provider type (e.g., an API for a VMWare vCenter or Amazon EC2) to identify the virtual machines present in the virtualized environment (e.g., identify, among others, the virtual machines of virtualization server 105-*a* and the virtual machines of virtualization server 105-*b*). After completing the scan of the one or more virtualized environments, a listing of the identified virtual machines may be presented in the user interface and the method may proceed to step 307.

In some embodiments, instead of performing an automatic scan of the one or more virtualized environments, the user may manually enter data identifying each virtual machine to be monitored.

At step 307, selections may be received that identify which of the one or more virtual machines of the listing presented in step 305 should be monitored. The selections may be made by the user via interactions with the user interface (e.g., by interacting with checkboxes corresponding to the virtual machines that should be monitored). After the selections have been received, the method proceeds to step 309.

At step 309, selections may be received that identify which license should be applied to each of the one or more virtual machines that should be monitored. For example, a new listing may be presented in the user interface that includes only the one or more virtual machines that should be monitored and the user may be able to view the details of each of the one or more virtual machines. The user may then be able to select a particular license identified by the database records of the license information that should be applied to each of the one or more virtual machines that should be monitored. In some embodiments, the selections may be performed via dropdown boxes, popup windows, or the like.

The user interface 800 of FIG. 8 provides an example detail view screen for a particular virtual machine. Using the example screen depicted in FIG. 8, the user may be able to view and/or modify various settings of the virtual machine. For example, the user may be able to view and/or change the identifier (e.g., name) of the virtual machine at input 810; the user may be able to view and/or change the virtualized environment (e.g., datacenter) to which the virtual machine is allocated at input 812; the user may be able to view and/or change the license to apply to the virtual machine at input 814; the user may be able to view and/or change a user-supplied tag for the virtual machine at input 816; the user may be able to view and/or change a threshold core limit that sets a limit for an alert condition (as described below in connection with step 404 of FIG. 4) at input 818; the user may be able to view and/or change the actions to take upon determining an alert condition (as described below in connection with steps 405 and 406 of FIG. 4) at input 820; the user may be able to view the IP address allocated to the virtual machine at input 822; the user may be able to view and/or change whether the virtual machine is to be monitored at input 824; the user may be able to view the unique identifier assigned to the virtual machine at input 826; the user may be able to view the last time the information of the virtual machine was updated at input 828; the user may be able to view the last time the virtual machine was monitored (e.g., metrics obtained for the virtual machine, as described in FIG. 4) at input 830; and the user may be able to view and/or change any user-supplied notes for the virtual machine at input 832.

Once the selections are complete, the user interface may present a confirmation dialog before storing data committing the selections. If the user confirms that the selections are correct, the method may proceed to step 311.

At step 311 of FIG. 3, data associations may be stored that define the relationship between the one or more virtual machines that should be monitored and the licenses that apply to each of the one or more virtual machines (e.g., a virtual machine-license pair). Additional associations may be stored that identify or associate what specific metrics should be determined for a virtual machine-license pair. For example, data associating a particular virtual machine to a particular license may be stored (e.g., in accordance with the selections at step 309) along with information identifying which virtualized environment includes the virtual machine. Further, a set of metrics may be identified based on a particular virtual machine-license pair, and data identifying what types of metrics should be determined when the virtual machine is being monitored may be stored. Such data associations and/or metric identifications may be stored in license store 112-*b*.

Figure 4:
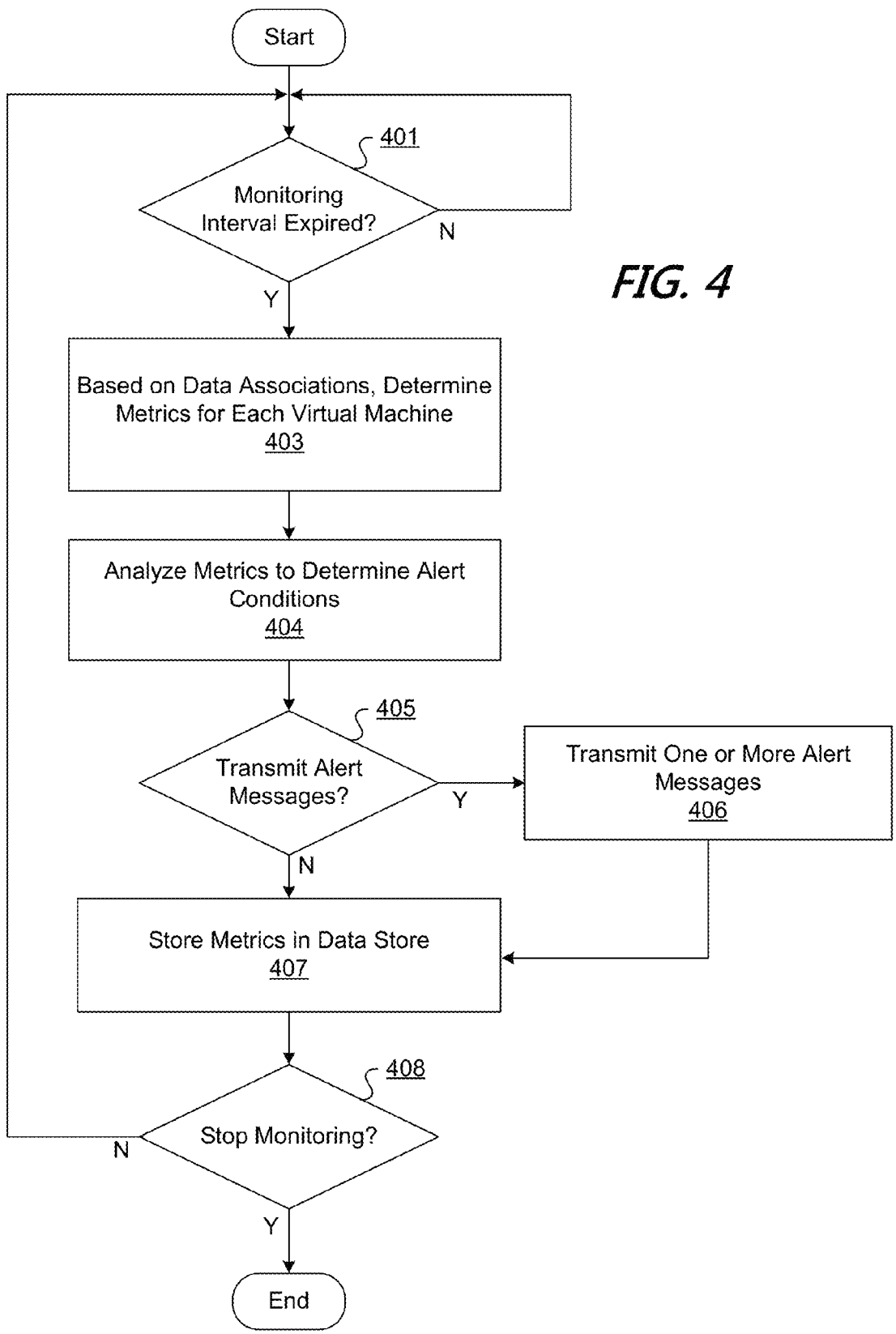

FIG. 4 illustrates an example method for monitoring one or more virtual machines to determine one or more metrics related to how the one or more virtual machines executed in the virtualized environment. In some embodiments, the method of FIG. 4 may be performed by the data monitor 112-*c* of the monitoring virtual machine 112.

At step 401, it may be determined whether a monitoring interval has expired. In some embodiments, the monitoring interval may be pre-determined (e.g., set by the third-party vendor of the monitoring virtual machine 112, set at deployment of the monitoring virtual machine 112 by an operator of the virtualized environment). The monitoring interval may define the periodic schedule for repeating the monitoring processes and/or a time period the data monitor 112-*c* must wait before repeating the monitoring processes. For example, in some embodiments, the monitoring interval may be customized within certain parameters (e.g., a number of hours or other time period).

If the monitoring interval has not expired, the method may proceed back to step 401 to continue waiting until the monitoring interval has expired. If the monitoring interval has expired, the method may proceed to step 403.

In some embodiments, instead of performing the monitoring based on an interval, the monitoring processes may be performed on an on-demand basis.

At step 403, metrics may be determined or otherwise obtained for each of the one or more virtual machines that should be monitored based on the data associations stored at step 311. For example, using the data associations stored at step 311, each virtual machine that should be monitored may be identified along with the information identifying the virtualized environment that includes each virtual machine. A set of metrics may be identified by, for example, determining which license applies to each virtual machine (e.g., via the license information stored in license store 112-*b*) and determining which set of metrics corresponds to the determined license (e.g., based on mapping information stored in data store 112-*d*). Alternatively, the data associations stored at step 311 may include an identification of the set of metrics and, in such embodiments, the set of metrics may be retrieved based on the identification in the data associations. After identifying both the information necessary to connect to the virtualized environment of each virtual machine and the set of metrics that should be determined for each virtual machine, the connections to the necessary virtualized environments may be established and queries (e.g., one or more calls using the API provided by the hypervisor) may be performed to each virtual machine and/or hypervisor of the virtualized environment(s) to determine or otherwise obtain the set of metrics for each virtual machine.

An example set of metrics for an example virtual machine is provided below. Depending on the type of license and/or type of virtual machine, additional or different metrics may be determined or obtained. For example, instead of or in addition to determining metrics describing processor usage, metrics describing usage of other physical devices may be determined.

i. A virtual machine name that identifies the virtual machine (e.g., a name of virtual machine 110-*a*).

ii. Virtual machine metadata that provides other identifying information for the virtual machine.

iii. An indication of a physical processor allocation that identifies which physical processor the virtual machine was informed by the hypervisor to be allocated from a physical processor pool for executing the virtual machine.

iv. An indication of physical processor usage that identifies an amount the virtual machine used the allocated physical processor.

v. An indication of a physical processor type that identifies which type of physical processor the virtual machine was informed by the hypervisor to be allocated from a physical processor pool for executing the virtual machine.

vi. An indication of memory allocation that identifies a hardware memory resource the virtual machine was informed by the hypervisor to be allocated from a physical processor pool.

vii. An indication of memory usage that identifies an amount the virtual machine used the allocated memory.

viii. An indication of I/O usage that identifies an amount the virtual machine used a physical I/O device.

ix. An indication of disk usage that identifies an amount the virtual machine used a physical disk device.

x. An indication of an underlying physical processor class that identifies which class of processor was used from the physical resource pool to execute the virtual machine.

xi. An indication of an underlying physical processor type that identifies which type of processor was used from the physical resource pool to execute the virtual machine.

xii. A timestamp that identifies a beginning or ending time for determining the metrics for the virtual machine.

As seen in the above example set of metrics, two different indications regarding a physical processor type may be determined (e.g., the indication of the physical processor type assigned and the indication of the underlying physical processor type). In some instances, a hypervisor may not inform the virtual machine that it is being assigned to a physical processor with excess capacity. Thus, in such instances, the type indicated by the indication of the physical processor type may be different from the type indicated by the indication of the underlying physical processor type. By determining both indications of physical processor type, a user may be able to be informed of that the virtual machine used a different type of physical processor, or additional actions may be performed to adjust the license based on the use of the different type of physical processor.

As also seen in the above example set of metrics, an indication of the underlying physical processor class is also determined. In some instances, even if the number of physical processor cores allocated to a virtual machine is within license limits, the indication of the underlying physical processor class may identify a class of physical processor that has a speed in excess or within license limits. By determining the indication of the underlying physical processor class, a user may be able to be informed that the class of physical processor was used to execute the virtual machine, or additional actions may be performed to adjust the license based on the user of the class of physical processor.

After each set of metrics has been determined, the method may proceed to step 404. In some embodiments, however, steps 404-406 may not be performed or may be disabled. Further, in some embodiments, any of steps 404-406 may be performed after step 405. In such arrangements, the method may proceed instead to step 407.

At step 404, after determining the set of metrics for each virtual machine, the set of metrics may be analyzed to determine one or more alert conditions. For example, an alert condition may be determined based on the metrics in various ways, including by comparing one or more metrics from the set of metrics to one or more other metrics from the set of metrics; to information stored in the data store 112-*d*; to information stored in the license store 112-*b*; and/or to other types of data specifying a limit for an alert condition. As a few particular examples, the indication of the underlying physical processor type may be compared to the indication of the physical processor type to determine if different types are indicated and, if so, an alert condition may be determined; the licensed core identifier stored in the license store 112-*b* may be compared to one or more of the metrics to determine if usage has resulted in an overage of the license and, if so, an alert condition may be determined; or one or more metrics may be compared to a previous set of metrics (e.g., retrieving a previous database record from data store 112-*d* that includes a previous version of the determined metrics) to determine if values have changed and, if so, an alert condition may be determined. Another type of alert condition may be based on a user-set condition including, for example, an alert condition based on a threshold number of cores that if exceeded causes an alert condition to be determined (e.g., alert threshold as set by a user via input 818 of FIG. 8). After analyzing the set of metrics, the method may proceed to step 405. It is noted that in some instances the analysis of the set of metrics may result in a determination of zero alert conditions.

At step 405, it may be determined whether to transmit one or more alert messages. For example, if at least one alert condition was determined at step 404, it may be determined that one or more alert messages are to be transmitted (e.g., the monitoring VM 112 may be configured to transmit an alert message for each alert condition determined at step 404). If zero alert conditions were determined at step 404, it may be determined that no alert messages are to be transmitted. Additionally or alternatively, the determination of whether to transmit one or more alert messages may be conditioned upon the type of alert condition and/or configurable settings specifying when alert messages should be transmitted. An example of a particular type of alert condition and an example of a few types of alert messages that can be transmitted are illustrated in FIG. 8. Input 818 of FIG. 8 illustrates an example alert condition for a number of physical processor cores and has a limit set to 1. Input 820 illustrates an example listing of messages that can be transmitted in response to the alert condition being determined and, as illustrated, transmission of a system alert message is set as being one of the actions to take when the limit is exceeded. Accordingly, if an alert condition for the number of physical processor core was determined at step 404 (e.g., the alert condition for the number of physical processor core may be determined if the set of metrics specify that 2 or more physical processor cores were used) and if transmission of at least one message is set as an action to take (e.g., transmission of the system alert message is set as an action to take, as illustrated by input 820 of FIG. 8), it may be determined to transmit one or more alert messages. If it is determined to transmit one or more alert messages, the method may proceed to step 406. Otherwise, the method may proceed to step 407.

At step 406, one or more alert messages may be transmitted. In some embodiments, an alert message may be transmitted to a predetermined destination (e.g., via e-mail to a predetermined e-mail address or to another software entity that handles alerts) so that the alert message can be processed (e.g., by displaying an indication of the alert condition, logging the alert condition, or otherwise informing one or more users of the presence of the alert condition). In some arrangements, the alert messages that are transmitted may be conditioned upon the types of alert conditions that were determined at step 404 and data specifying what alert messages should be transmitted. For example, based on the illustrated example in FIG. 8, upon determining an alert condition for a number of physical processor cores (e.g., based on the limit of input 818 of FIG. 8), an e-mail message, a Short Message Service (SMS) message, and/or a system alert message may be transmitted. Because only a system alert message is set as one of the actions to take in the illustrated example of FIG. 8 (e.g., based on the settings of input 820), a system alert message may be transmitted.

After an alert message is received by a destination, one or more users may be alerted to or otherwise informed of the alert condition in various ways including, for example: by displaying a visual indication of the alert condition on a display screen, by sounding an audible indication of the alert condition. In some embodiments, the user may be able to navigate a user interface to view a listing alerts (e.g., as illustrated by alert summary 950 of FIG. 9 and alert summary 1050 of FIG. 10) that has an entry for each event message that was received.

Steps 405 and 406 of FIG. 4, which transmit one more alert messages responsive to determination of an alert condition, provide an example of the actions that may be taken responsive to determining an alert condition. Additional or alternative actions may be taken responsive to determining an alert condition. For example, in some arrangements, the alert condition (or alert message) may be stored in the data store 112-*d* for inclusion in a later report. The alert condition may be accompanied by a time- or date-stamp.

After transmitting the one or more alert messages at step 406, the method may proceed to step 407.

At step 407 of FIG. 4, after determining the set of metrics for each virtual machine (and, in some embodiments after determining one or more alert conditions and/or transmitting one or more alert messages), each set of metrics may be stored in the data store 112-*d*. For example, a database record for each set of metrics may be created and stored to data store 112-*d*. In addition to the metrics determined via queries to the virtual machine and/or hypervisor at step 403, the database record for the metrics may include additional information, such as the following data fields.

i. An application identifier that identifies the application that was executed by the virtual machine.
  ii. A vendor identifier that identifies a vendor of the virtual machine or the application.
  iii. License information that identifies various properties of the license applied to the virtual machine from the license store 112-*a*. In some embodiments, the license information may take the form of a license number that identifies the license or a pointer to the license information in the license store 112-*a*.
  iv. Transaction ID that identifies a unique identifier for the database record.

In some embodiments, the database record may be read only and may not be modified once stored. Additionally, in some embodiments, when a new database record for each set of metrics is to be stored, the previous database record for each set of metrics may be moved to a back-up location (e.g., a back-up table or partition of the data store 112-*d*).

After storing each set of metrics, the method may proceed to step 408.

At step 408, it may be determined whether to stop monitoring. For example, a user may have established a stop condition (e.g., monitor for 6 days then stop or monitor for a particular number of times then stop). If that stop condition was reached, the method may end. Otherwise, the method may proceed to step 401 to repeat the monitoring processes.

Figure 5:
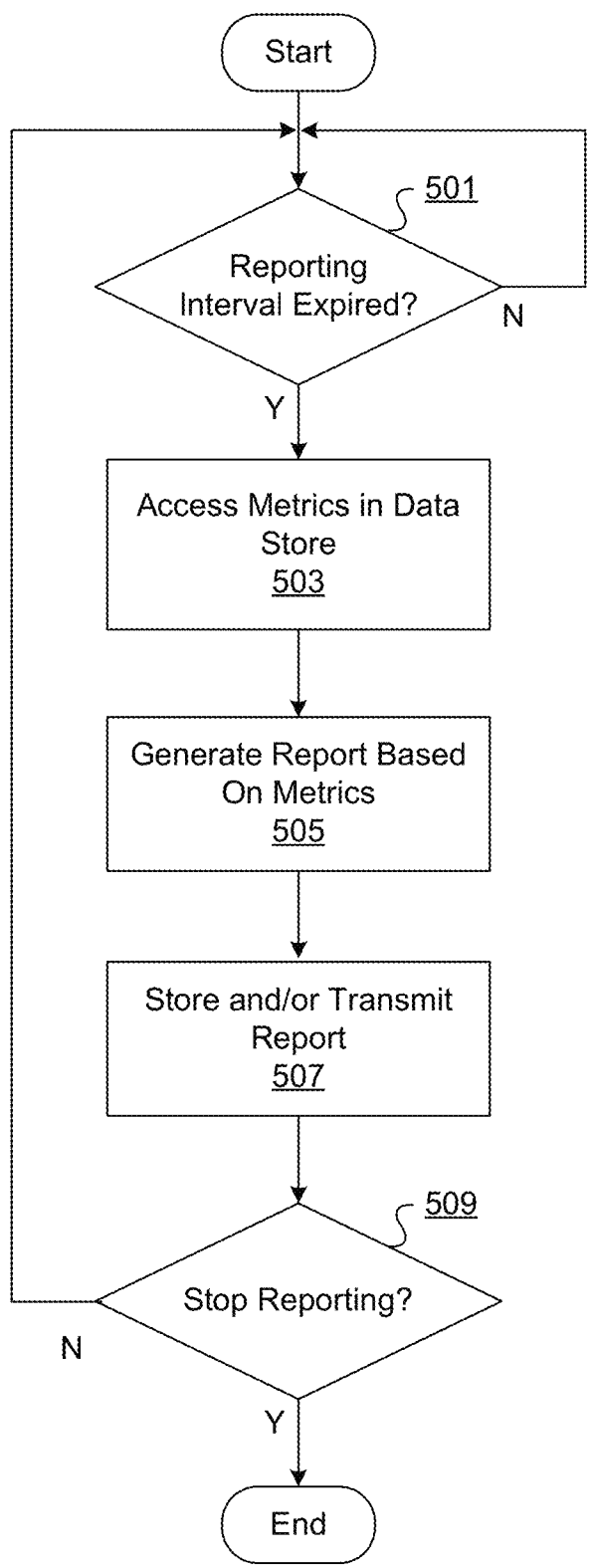

FIG. 5 illustrates an example method for generating a report that includes data describing how one or more virtual machines or applications executed in the virtualized environment. In some embodiments, the method of FIG. 5 may be performed by the report generator 112-*e* of the monitoring virtual machine 112.

At step 501, it may be determined whether a reporting interval has expired. In some embodiments, the reporting interval may be pre-determined (e.g., set by the third-party vendor of the monitoring virtual machine 112, or set by a user according to a user-defined time or date range and periodicity). The reporting interval may define the periodic schedule for generating and/or making a report accessible to a user. Additionally, reports may be performed on a user-defined interval.

If the reporting interval has not expired, the method may proceed back to step 501 to continue waiting for a time when the reporting interval has expired. If the reporting interval has expired, the method may proceed to step 503.

At step 503, the database records that include the metrics and are stored in data store 112-*d* may be accessed. In some embodiments, the report may include data for a particular time period (e.g., the period of time between the time of the previous report and current time). Accordingly, the database records having timestamps between the particular time period may be accessed and retrieved for further analysis. Additionally, a report may be dedicated to the metrics of a particular virtual machine or application. Accordingly, database records with metrics only for a particular virtual machine or one or more virtual machines that execute the application may be accessed and retrieved for further analysis. After accessing the appropriate database records have been accessed and/or retrieved for further analysis, the method may proceed to step 505.

At step 505, the report may be generated based on the metrics. The report, once generated, may include data describing how one or more virtual machines or applications executed in the virtualized environment. For example, based on the data records accessed and/or retrieved for further analysis in step 503, various statistics describing how the physical computing resources were used when an application or a virtual machine was executed in the virtualized environment. As a more specific example, if the report is being generated for a particular application and the application was executed using two or more virtual machines or the hypervisor informed the virtual machine of a different type of physical processor than was actually used to execute the virtual machine, there may be multiple types of physical processors indicated as being used in the metrics. Accordingly, a number of average and/or peak statistics may be determined for inclusion in the report. The report may include, among others, statistics that provide allocation and/or usage by physical processor type, make, model, and computing speed; statistics that provide an aggregated number of processor cores assigned to each virtual machine that executes a specific program or application across one or more virtualized environments or a distributed computing network. Examples of such statistics may include an indication of a peak physical processor allocation without respect to physical processor type, one or more indications of a peak physical processor allocation for each physical processor type, an indication of an average physical processor allocation without respect to physical processor type, and one or more indications of a physical processor allocation for each physical processor type.

Additionally, the statistics may be determined and used to generate one or more graphs for inclusion in the report. For example, indications of physical processor allocation may be organized by time and then used to produce a bar graph that plots the physical processor allocation over time. In addition to the statistics, the report may include additional information including, for example, information identifying the third-party vendor of the monitoring virtual machine 112, a report title, a date or time range for the report, an application or virtual machine name, one or more license keys for the monitoring virtual machine 112. In order to determine the statistics or the other information of the report, information from the license store 112-b may be accessed and/or retrieved for further analysis and/or use.

Figure 9:
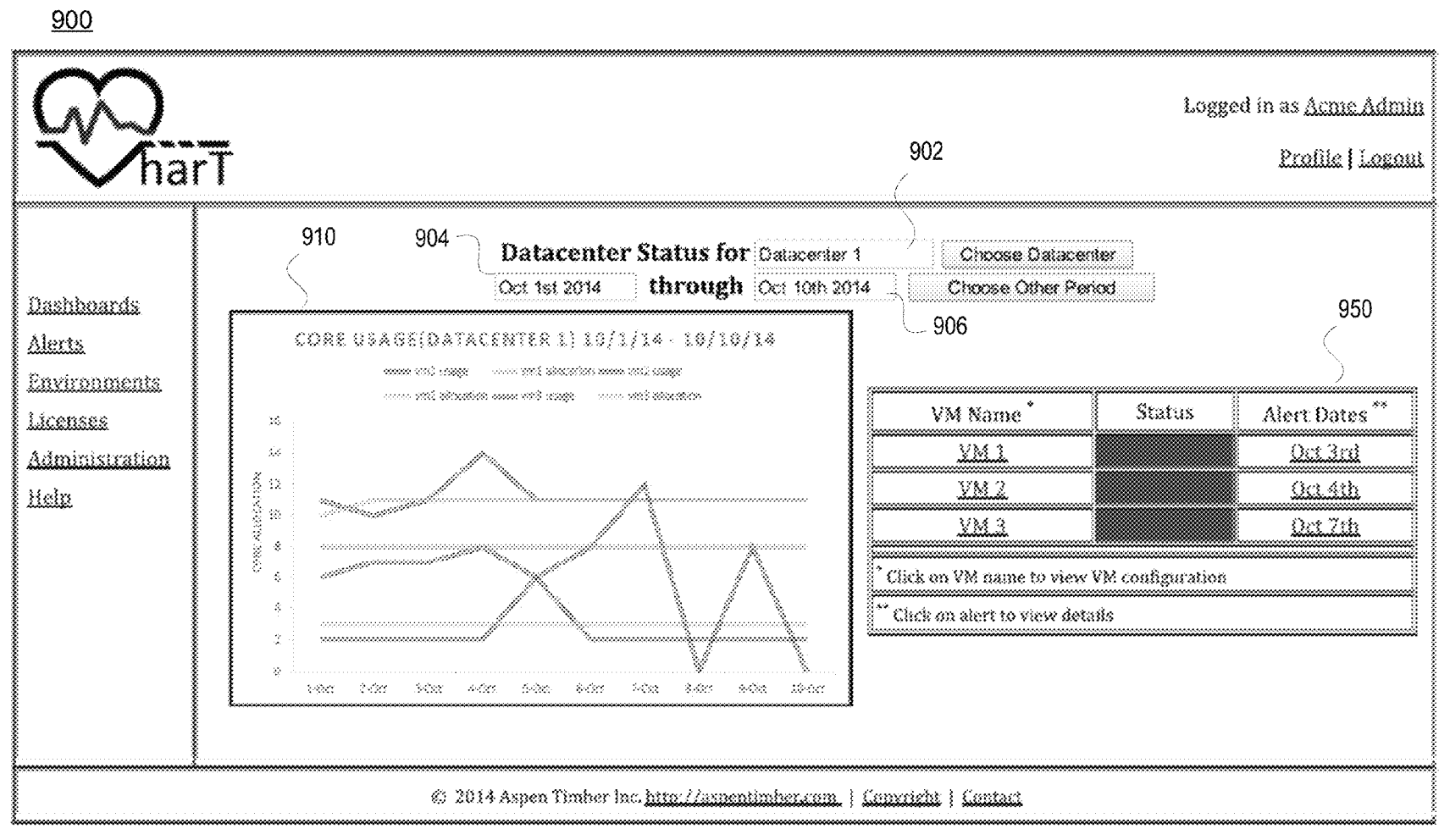

The user interface 900 of FIG. 9 provides an example graph 910 that could be included in a report and an alert summary 950 that provides a summary of one or more alerts for particular virtual machines that have been monitored, which also could be included in a report. User interface 900 also includes input 902 that allows a user to select a particular virtualized environment and inputs 904, 906 that allow a user to input a particular date range. Inputs 902, 904 and 906 provide the virtualized environment and dates which may be used to generate graph 910 and populate alert summary 950 (e.g., if the user is generating a custom report). In some variations, if the user is viewing a previously generated report via interface 900, inputs 902, 904 and 906 may be filled in with the appropriate data but a user may be unable to change the data.

For example, graph 910 illustrates that three virtual machines were monitored in a particular virtualized environment (e.g., "Datacenter 1"). As illustrated, graph 910 includes, for each virtual machine, a baseline indication as to what cores were reported by the hypervisor as being allocated to the virtual machine, which are labeled as "vm1 allocation," "vm2 allocation," and "vm3 allocation." The baseline indications may be based on one or more indications of the physical processor allocations, as stored in one or more data records from the data store 112-d. Graph 910 also includes, for each virtual machine, an indication of the underlying core usage of the virtual machine (e.g., what cores were actually used to execute the virtual machine), which are labeled as "vm1 usage," "vm2 usage," and "vm3 usage." The indication of the underlying core usage may be based on one or more indications of the underlying physical processor types or the underlying physical processor classes, as stored in one or more data records from the data store 112-d. The graph illustrates various instances when the underlying core usage of the virtual machines of the virtualized environment was different from the core usage the hypervisor allocated. For example, "vm1" is illustrated in graph 910 as being different at least at October 1, October 2 and October 4; "vm2" is illustrated in graph 910 as being different at least at October 1, October 2, October 3, October 5, October 7, October 8 and October 10; "vm3" is illustrated in graph 910 as being different at least at October 1 through October 4, October 5, and October 6 through October 10.

Alert summary 950 illustrates that each virtual machine of the virtualized environment has experienced an alert condition (e.g., by displaying a particular color status and by indicating the date at which the event occurred).

After generating the report, the method may proceed to step 507 of FIG. 5.

At step 507, the report may be stored and/or transmitted, via a network, for further use. For example, the report may be stored in a location accessible to a vendor of the virtualized environment or an end-user of the virtualized environment. In some embodiments the report may be stored in a read-only format. The report may be transmitted, via a network, to one or more e-mail addresses, such as e-mail address of the third-party vendor of the monitoring virtual machine. In some arrangements, the report may be transmitted in a read-only format. The report may further be transmitted in a secure (e.g., encrypted) format. After storing and/or transmitting the report, the method may proceed to step 509.

At step 509, it may be determined whether to stop reporting. For example, a user may have established a stop condition (e.g., generate reports for 10 days then stop). If that stop condition was reached, the method may end. Otherwise, the method may proceed to step 501 to repeat the reporting processes. As another example, the report may be have been generated on an on-demand basis (instead of reporting based on a reporting interval). If being performed on an on-demand basis, the method may end.

Figure 6:
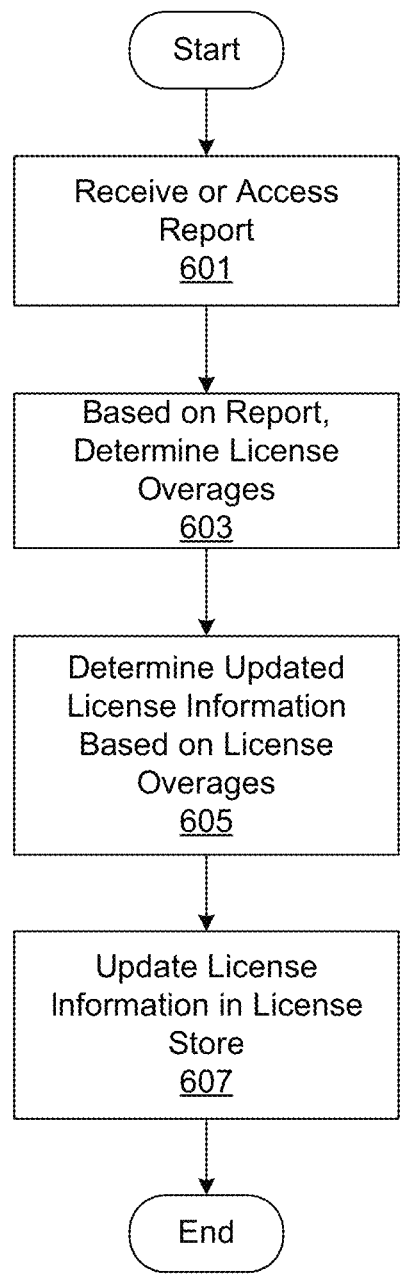

FIG. 6 illustrates an example method for updating license information based on a report that includes data describing how one or more virtual machines executed in the virtualized environment. In some embodiments, the method of FIG. 6 may be performed by the monitoring virtual machine 112 or a component of the monitoring virtual machine 112, such as web portal 112-a. Additionally, the method of FIG. 6 may be performed by a different computing device including a device able to access a location where a report is stored or a computing device that received the report after transmission via a network. Further, the example of FIG. 6 will be described in terms of the usage being above the limits of a license (e.g., license overage). A similar example may be performed in the case of the usage being below the limits of a license.

At step 601, the report may be accessed for further analysis and/or viewing. For example, the web portal 112-a may allow a user to select and view a stored report via a user interface.

At step 603, license overages may be determined based on the contents of the report. For example, a user may be able to view the report and determine whether usage has resulted in an overage of the appropriate license. If an overage of the license has occurred, the user may also determine a magnitude of the license overage (e.g., how much physical processor allocation exceeded the license, or the value of the physical processor allocation that caused the overage of the license) and enter that amount into the user interface. Alternatively, the web portal 112-*a* may execute a script to analyze the report and determine whether usage has resulted in an overage of the appropriate license. If an overage has occurred, the script may further determine a magnitude of the license overage. For example, one or more statistics of the report may indicate that the peak or the average physical processor allocation is above a license limit. The report may be analyzed to determine which statistic caused the license overage. This statistic may be used at step 605 when determining to update license information.

Figure 10:
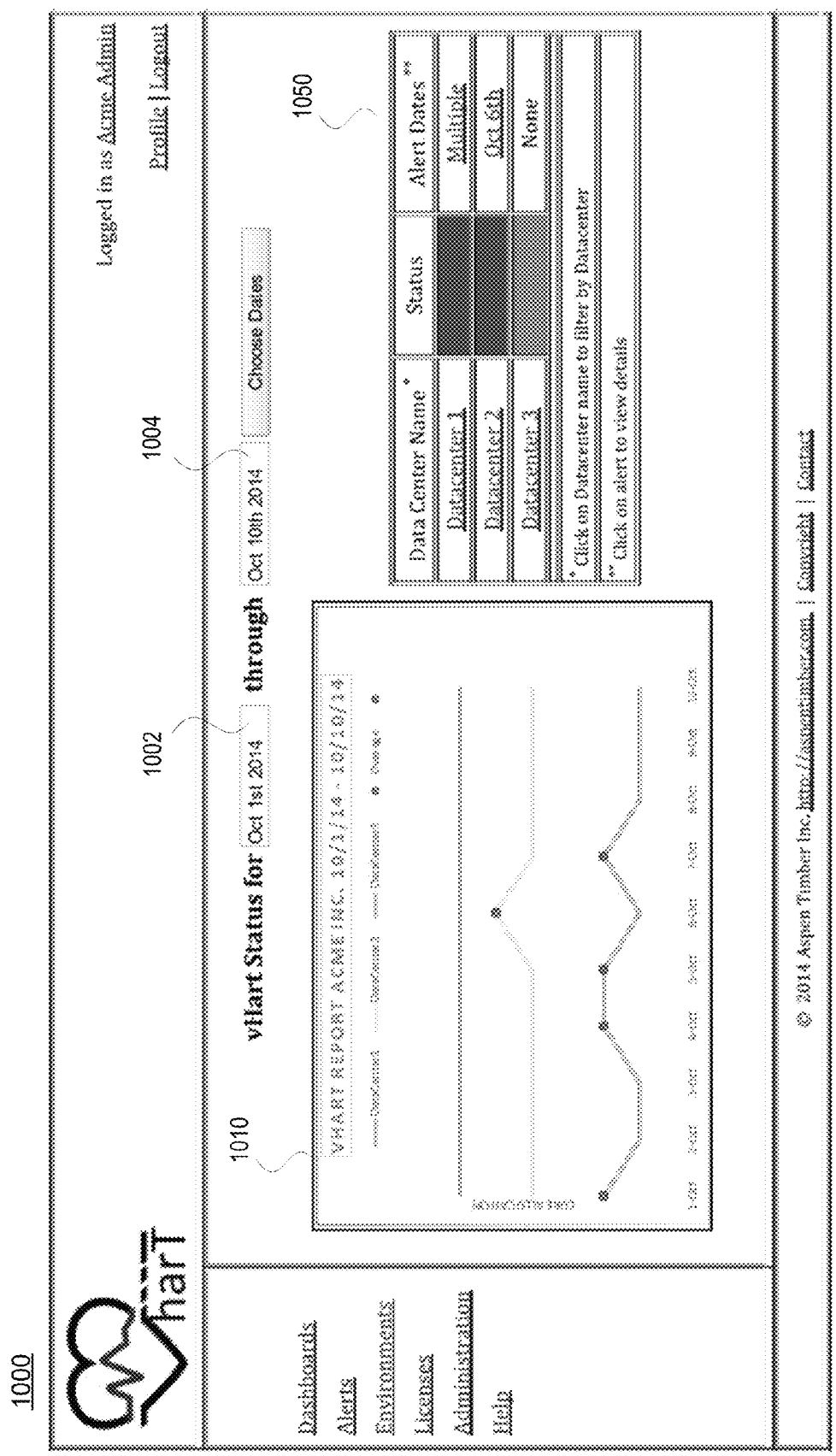

The user interface 1000 of FIG. 10 provides an illustration depiction of license overages that may be determined at step 603. In particular, a graph 1010 includes various license overage indications based on the determined license overages and alert summary 1050 includes information related to the determined license overages. Graph 1010 and alert summary 1050 may, in some variations, be included in a report. User interface 1000 also includes inputs 1002 and 1004 that allow a user to input a particular date range, which can be used to generate graph 1010 and populate alert summary 950 (e.g., if the user is generating a custom report). In some variations, if the user is viewing a previously generated report via interface 1000, inputs 1002 and 1004 may be filled in with the appropriate data but a user may be unable to change the data.

Graph 1010 illustrates the usage for three virtualized environments (e.g., "Datacenter 1," "Datacenter 2," and "Datacenter 3"). The usage for each of the virtualized environments may be determined by, for example, aggregating the usage (e.g., the underlying usage) of the virtual machines executing in the virtualized environment (e.g., the usage for "Datacenter 1" may be the aggregate of the "vm1 usage," the "vm2 usage," and the "vm3 usage" of FIG. 9). As illustrated, graph 1010 includes, for each virtualized environment, an indication of the usage for the virtualized environment between the dates indicated by inputs 1002 and 1004. License overages have also been determined based on the usage for each virtualized environment and the graph 1010 includes license overage indications at the appropriate locations. For example, "Datacenter 1" is illustrated in graph 1010 as having license overages at October 1, October 4, October 5 and October 7; "Datacenter 2" is illustrated in graph 1010 as having a license overage at October 6; "Datacenter 3" is illustrated as not having any license overages.

Event summary 1050 illustrates that "Datacenter 1" and Datacenter 2" have each experienced an alert condition (e.g., by displaying a particular color status and by indicating the date at which the event occurred or by indicating that multiple events have occurred) and that "Datacenter 3" did not have an alert condition. The alert conditions may be whether a license overage occurred.

At step 605 of FIG. 6, updated license information may be determined based on the license overages. For example, if the peak physical processor allocation was determined at step 603 as causing an overage of the license, updated license information may be determined such that the peak physical processor allocation would not cause or otherwise result in an overage of the updated license information (e.g., change the licensed core identifier of the corresponding license until the peak physical processor allocation would not exceed the capacity of the licensed core). A similar process could be performed if an average physical processor allocation was found to cause or otherwise result in an overage of the license. Additionally, similar to step 603, the determination of step 605 may be performed in a manual (e.g., via a user manually entering the updated license information) or automatic process (e.g., via a script that adjusts or updates license information iteratively until an overage of the updated license information is no longer caused).

At step 607, the license store 112-*a* may be updated with the updated license information. For example, if the report describes how a particular virtual machine or application used the physical computing resources, the license information within license store 112-*a* for the particular virtual machine or application may be updated with the updated license information. In some embodiments, prior to updating the license store 112-*a*, one or more users may have to agree to performing the update. For example, the vendor of the virtualized environment and/or the end-user of the virtualized environment may have to both agree to the update license information before the license store 112-*a* can be updated.

While FIG. 6 illustrates an example of updating license information based on a license overage, a similar method may be performed based on usage less than the limits set by a license. As one example, such under use of a license may be depicted at FIG. 9, which illustrates that "vm1 usage" is less than the "vm1 allocation" for at least the period between October 7 through October 10. Under use of a license may be determined based on such data. License information may be updated similar to step 605 until the usage is at or within a threshold of the license limits. In some variations, an event condition (e.g., the event conditions determined at step 403 or displayed in the event summaries of FIGS. 9 and 10) may be determined based on whether under use of a license occurs.

In addition to updating license information based on license overages and under use, the reports generated may be used in various other ways. For example, a user may be able to reduce ongoing technical services costs by using the reports to show actual use that is less than the capacity allowed by a license. The reports could also be used for network capacity planning (e.g., adjust the number of servers available in a virtualized environment based on one or more reports showing excess usage or based on one or more reports showing unused capacity).

Comparing the information of FIG. 9 and FIG. 10 illustrate different ways in which the monitored usage can be organized (e.g., into different types of reports). For example, FIG. 9 illustrates that monitored usage can be organized by virtual machine (e.g., the virtual machines monitored for a particular virtualized environment). FIG. 10 illustrates that monitored usage can be organized by virtualized environment (e.g., an aggregation of the virtual machines executing in each virtualized environment). The monitored usage could be organized in other ways including, for example, by application (e.g., an aggregation of the virtual machines in one or more virtualized environments that execute a particular application).

Figure 7:
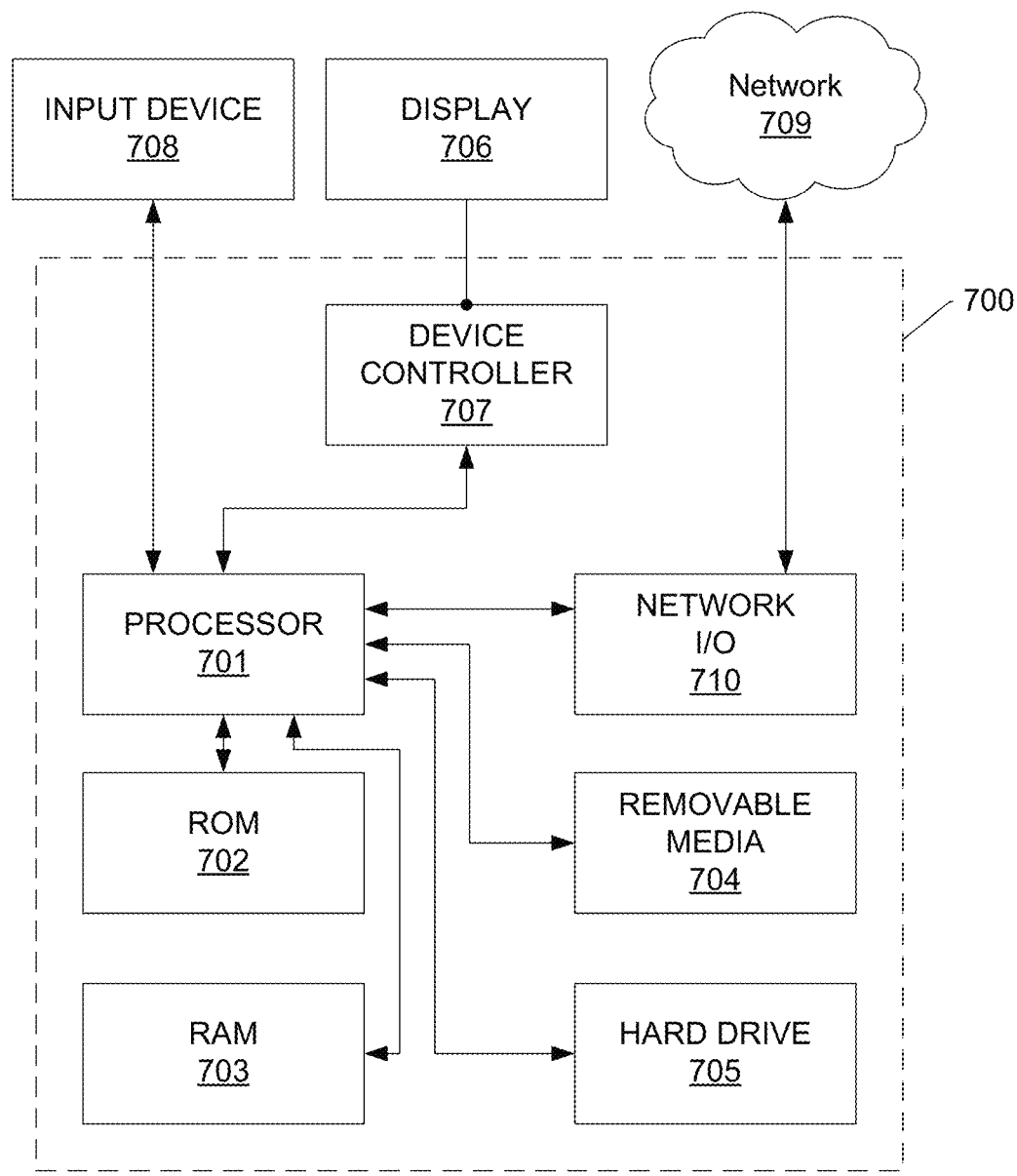
FIG. 7 depicts an illustrative computer system architecture that may be used in accordance with one or more aspects of the disclosure.

FIG. 7 illustrates general hardware elements and software elements that can be used to implement any of the various computing devices and/or software discussed herein, including those of virtualized environment 101. Device or apparatus 700 may include one or more processors 701, which may execute instructions of a computer program to perform any of the functions and steps described herein. The executable instructions may be stored in any type of computer-readable medium, memory, or storage device to configure the operation of the one or more processors 701. For example, executable instructions may be stored in a read-only memory (ROM) 702, random access memory (RAM) 703, removable media 704, such as a Universal Serial Bus (USB) drive, compact disk (CD) or digital versatile disk (DVD), hard drive, floppy disk drive, or any other desired electronic storage medium. Executable instructions may also be stored in hard drive 705, which may be an internal or external hard drive.

The device 700 may include one or more output devices, such as a display 706 (e.g., an external monitor or television), and may include one or more output device controllers 707, such as a video processor. In some embodiments, the device 700 may include one or more user input devices 708, such as a remote control, keyboard, mouse, touch screen, microphone, or any other input device.

The device 700 may also include one or more network interfaces, such as network input/output (I/O) interface 710 to communicate with one or more external networks 709. One or more external networks 709 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks. The network interface may be a wired interface, wireless interface, or a combination of the two. In some embodiments, network I/O interface 710 may include a cable modem, and the network 709 may include the interconnections 111 shown in FIG. 1, one or more external networks, an in-home network, a provider's wireless, coaxial, fiber, or hybrid fiber/coaxial distribution system (e.g., a DOCSIS network), or any other desired network.

Although the subject matter has been described in language specific to structural features and/or methodological acts, it is to be understood that the subject matter defined in any claim is not necessarily limited to the specific features or acts described above. Rather, the specific features and acts described above are described as some example implementations of the following claims.

We claim:

1. A method comprising:

accessing, by one or more computing devices, a first established virtualized environment in which a first set of virtual machines are executing resources, wherein the first established virtualized environment controls execution of the first set of virtual machines by at least allocating, via a hypervisor, one or more first physical processors from a first physical processor pool comprised of two or more types of physical processors;

receiving, by the one or more computing devices, license information that indicates a number and one or more types of physical processors licensed for executing a first virtual machine from the first set of virtual machines; and performing, by the one or more computing devices, a first monitoring process that monitors the first virtual machine for a difference between an allocation for the first virtual machine and execution of the first virtual machine within the first established virtualized environment, wherein the first monitoring process includes:

determining a first type of physical processor that the first virtual machine was informed by the hypervisor to be allocated from the first physical processor pool for executing the first virtual machine, determining a second type of physical processor that was used from the first physical processor pool to execute the first virtual machine, wherein the second type of physical processor has different capacity from the first type of physical processor, after storing an indication of the first type of physical processor and an indication of the second type of physical processor, generating data indicating the difference between the allocation for the first virtual machine and the execution of the first virtual machine within the first established virtualized environment, wherein the data indicates peak or average physical processor allocation and usage by physical processor type, determining whether the usage of the second type of physical processor has resulted in a license overage based on the data and the license information, and transmitting a secure report that provides license overage information and the data indicating the difference between the allocation for the first virtual machine and the execution of the first virtual machine within the first established virtualized environment.

2. The method of claim 1, further comprising:

determining a class of the second type of physical processor.

3. The method of claim 1, wherein the data indicating the difference between the allocation for the first virtual machine and the execution of the first virtual machine within the first established virtualized environment includes one or more indications of a peak physical processor allocation for first type of physical processor and one or more indications of a peak physical processor usage for the second type of physical processor.

4. The method of claim 1, wherein the data indicating the difference between the allocation for the first virtual machine and the execution of the first virtual machine within the first established virtualized environment includes one or more indications of an average physical processor allocation for each of the first type of physical processor and the second type of physical processor.

5. The method of claim 1, wherein the determining the first type of physical processor includes querying the virtual machine; and wherein the determining the second type of physical processor includes querying the hypervisor.

6. The method of claim 1, wherein the generating the data indicating the difference between the allocation for the first virtual machine and the execution of the first virtual machine within the first established virtualized environment includes:

determining an alert condition based on a comparison of the first type of physical processor and the second type of physical processor, and generating a graph based on the first type of physical processor and the second type of physical processor; and wherein the secure report provides the graph and the alert condition.

7. The method of claim 1, wherein the first established virtualized environment is being provided by a first cloud computing provider, and wherein the method further comprises:

accessing, by the one or more computing devices, a second established virtualized environment that is being provided by a second cloud computing provider and in which a second set of virtual machines is executing, wherein the second established virtualized environment controls execution of the second set of virtual machines by at least allocating one or more second physical processors from a second physical processor pool; and performing a second monitoring process that monitors a second virtual machine of the second set of virtual machines for a difference between a type of physical processor that the second virtual machine was informed to be allocated from the second physical processor pool and a type of physical processor that was used from the second physical processor pool to execute the second virtual machine, wherein the second monitoring process includes:

determining which type of physical processor the second virtual machine was informed to be allocated from the second physical processor pool for executing the second virtual machine, resulting in an allocated type of physical processor for the second virtual machine, determining which type of physical processor was used from the second physical processor pool to execute the second virtual machine, resulting in a used type of physical processor for the second virtual machine, wherein the used type of physical processor is different from the allocated type of physical processor, and based on a comparison of the used type of physical processor and the allocated type of physical processor, transmit an alert message indicating a difference between the used type of physical processor and the allocated type of physical processor.

8. An apparatus, comprising:

at least one processor; and memory storing executable instructions configured to, when executed by the at least one processor, cause the apparatus to:

access an established virtualized environment in which a set of virtual machines are executing resources, wherein the established virtualized environment controls execution of the set of virtual machine by at least allocating, via a hypervisor, one or more physical processors from a physical processor pool comprised of two or more types of physical processors;

receive license information that indicates a number and one or more types of physical processors licensed for executing a virtual machine from the set of virtual machines; and perform a monitoring process that monitors the virtual machine for a difference between an allocation for the virtual machine and execution of the virtual machine within the established virtualized environment, wherein the monitoring process includes:

determining a first type of physical processor that the virtual machine was informed by the hypervisor to be allocated from the physical processor pool for executing the virtual machine, determining a second type of physical processor that was used from the physical processor pool to execute the virtual machine, wherein the second type of physical processor has different capacity from the first type of physical processor, after storing an indication of the first type of physical processor and an indication of the second type of physical processor, generating data indicating the difference between the allocation for the virtual machine and the execution of the virtual machine within the established virtualized environment, wherein the data indicates peak or average physical processor allocation and usage by physical processor type, determining whether the usage of the second type of physical processor has resulted in a license overage based on the data and the license information, and transmitting a secure report that provides license overage information and the data indicating the difference between the allocation for the virtual machine and the execution of the virtual machine within the established virtualized environment.

9. The apparatus of claim 8, wherein the executable instructions, when executed by the at least one processor, cause the apparatus to:

determine a class of the second type of physical processor.

10. The apparatus of claim 8, wherein the data indicating the difference between the allocation for the virtual machine and the execution of the virtual machine within the established virtualized environment includes one or more indications of a peak physical processor allocation for the first type of physical processor and one or more indications of a peak physical processor usage for the second type of physical processor.

11. The apparatus of claim 8, wherein the data indicating the difference between the allocation for the virtual machine and the execution of the virtual machine within the established virtualized environment includes one or more indications of an average physical processor allocation for the first type of physical processor and one or more indications of an average physical processor usage for the second type of physical processor.

12. The apparatus of claim 8, wherein causing the apparatus to determine the first type of physical processor includes causing the apparatus to query the virtual machine.

13. The apparatus of claim 12, wherein causing the apparatus to determine the second type of physical processor includes causing the apparatus to query the hypervisor.

14. One or more non-transitory computer-readable media storing executable instructions configured to, when executed, cause at least one computing device to:

access an established virtualized environment in which a set of virtual machines are executing, wherein the established virtualized environment controls execution of the set of virtual machines by at least allocating, via a hypervisor, one or more physical processors from a physical processor pool comprised of two or more types of physical processors;

receive license information that indicates a number and one or more types of physical processors licensed for executing a virtual machine from the set of virtual machines; and perform a monitoring process that monitors the virtual machine for a difference between an allocation for the virtual machine and execution of the virtual machine within the established virtualized environment, wherein the monitoring process includes:

determining a first type of physical processor that the virtual machine was informed by the hypervisor to be allocated from the physical processor pool for executing the virtual machine, determining a second type of physical processor that was used from the physical processor pool to execute the virtual machine, wherein the second type of physical processor has different capacity from the first type of physical processor, after storing an indication of the first type of physical processor and an indication of the second type of physical processor, generating data indicating the difference between the allocation for the virtual machine and the execution of the virtual machine within the established virtualized environment, wherein the data indicates peak or average physical processor allocation and usage by physical processor type, determining whether the usage of the second type of physical processor has resulted in a license overage based on the data and the license information, and transmitting a secure report that provides license overage information and the data indicating the difference between the allocation for the virtual machine and the execution of the virtual machine within the established virtualized environment.

15. The one or more computer-readable media of claim 14, wherein the executable instructions, when executed, cause the at least one computing device to:

determine a class of the second type of physical processor.

16. The one or more computer-readable media of claim 14, wherein the data indicating the difference between the allocation for the virtual machine and the execution of the virtual machine within the established virtualized environment includes one or more indications of a peak physical processor allocation for the first type of physical processor and one or more indications of a peak physical usage for the second type of physical processor.

17. The one or more computer-readable media of claim 14, wherein the data indicating the difference between the allocation for the virtual machine and the execution of the virtual machine within the established virtualized environment includes one or more indications of an average physical processor allocation for the first type of physical processor and one or more indications of an average physical processor usage for the second type of physical processor.

18. The one or more computer-readable media of claim 14, wherein causing the at least one computing device to determine the first type of physical processor includes causing the at least one computing device to query the virtual machine, and wherein causing the at least one computing device to determine the second type of physical processor includes causing the at least one computing device to query the hypervisor.

* * * * *